United States Patent
Jang (10) Patent No.: US 7,916,473 B2
(45) Date of Patent: Mar. 29, 2011

(54) PORTABLE TERMINAL

(75) Inventor: Chang-Yong Jang, Seoul (KR)

(73) Assignee: LG Electronics Inc., Seoul (KR)

( * ) Notice: Subject to any disclaimer, the term of this patent is extended or adjusted under 35 U.S.C. 154(b) by 117 days.

(21) Appl. No.: 12/334,366

(22) Filed: Dec. 12, 2008

(65) Prior Publication Data

US 2009/0316354 A1 Dec. 24, 2009

(30) Foreign Application Priority Data

Jun. 19, 2008 (KR) .......................... 10-2008-0058057

(51) Int. Cl.
 *G06F 1/16* (2006.01)
(52) U.S. Cl. ................. 361/679.55; 345/158; 455/575.4
(58) Field of Classification Search .................. 345/156, 345/157, 158; 361/679.04, 679.05, 679.06, 361/679.21, 679.27, 679.29; 455/575.3, 455/575.4

See application file for complete search history.

(56) References Cited

U.S. PATENT DOCUMENTS

| 7,486,272 | B2 * | 2/2009 | Lo ................................. 345/156 |
| 7,576,982 | B2 * | 8/2009 | Wang et al. .............. 361/679.27 |
| 2005/0096082 | A1 | 5/2005 | Chang | |

FOREIGN PATENT DOCUMENTS

WO  WO 2008/004786 A1  1/2008
WO  WO 2008/038843 A1  4/2008

* cited by examiner

*Primary Examiner* — Hung V Duong
(74) *Attorney, Agent, or Firm* — Birch, Stewart, Kolasch & Birch, LLP (57) ABSTRACT

An open/close mechanism of a portable terminal is provided. The portable terminal is configured such that when applying a force to an upper body in a horizontal direction with respect to a lower body, a slide-slip module allows the upper body subsequently to slide in the horizontal direction and slip in a longitudinal thickness direction with respect to the lower body so as to implement an open state, whereby a step generation between an upper surface of the upper body and an upper surface of the lower body can be minimized, so as to achieve a structurally stable portable terminal.

27 Claims, 12 Drawing Sheets

PORTABLE TERMINAL

RELATED APPLICATION

The present disclosure relates to subject matter contained in priority Korean Application No. 10-2008-0058057, filed on Jun. 19, 2008, which is herein expressly incorporated by reference in its entirety.

BACKGROUND OF THE INVENTION

1. Field of the Invention

The present invention relates to an open/close mechanism of a portable terminal

2. Background of the Invention

Portable terminals can be easily carried and have one or more of functions such as supporting voice calls and telephony calls, inputting and/or outputting information, storing data and the like.

As portable terminals become multifunctional, they can be configured to capture still images or moving images, play music or video files, play games, receive broadcasts and the like, so as to be an integrated multimedia player.

The portable terminal requires hardware and software configuration to implement various functions and support operations of the components. For example, developing a user interface environment allowing a user to use the portable terminal more easily and conveniently have been actively pursued.

As the portable terminal is considered to be part of a person's personal belongings, a variety of form factors are provided to facilitate a selection of a portable terminal according to a user's individuality. The portable terminals are typically configured in many different types, including a bar type portable terminal having an input/output unit and a display disposed in one body, a folder or swing type portable terminal having one body rotatable with respect to another body to be open or closed, and a slide type portable terminal having one body slidable with respect to another body to be open or closed, and the like.

Among others, the slide type portable terminal is preferred due to its simple opening operation, a facilitation of recognition because a display is always exposed directly to the outside of the portable terminal, and the like. However, when one body is slid with respect to another body in the slide type portable terminal, a step may be formed therebetween, which may be considered to spoil an outer appearance of the portable terminal.

SUMMARY OF THE INVENTION

Therefore, an object of the present invention is to allow the use of a wider user interface area for a portable terminal by making one body slide with respect to another body to open or close the portable terminal and simultaneously to minimize a step formed after the sliding movement, thus to provide an improved outer appearance of the portable terminal.

In one aspect of the present invention, there is provided a portable terminal comprising: a lower body; an upper body laid on the lower body; a slide-slip module configured to couple the lower body to the upper body such that the upper body moves between a closed state in which the lower body is fully overlapped with the upper body and an open state in which the lower body is partially overlapped by the sliding movement of the upper body and the upper body is located lower than in the closed state by a slip motion; and an extension member slidably coupled to the lower body for accommodating the upper body in the open state.

As one example related to the present invention, a shielding member may be disposed at a side surface of the upper body to shield the slide-slip module.

As one example related to the present invention, an accommodating groove may be disposed at the extension member to accommodate the shielding member upon the slip motion of the upper body.

As one example related to the present invention, an upper surface of the upper body is flush with an upper surface of the lower body in the open state.

As one example related to the present invention, the slide-slip module may include an elastic unit configured to apply an elastic force to the upper body upon the sliding movement of the upper body.

As one example related to the present invention, the elastic unit may include a first slide member fixed to the upper body, a second slide member fixed to the slide-slip module and slidably coupled to the first slide member, and a spring having one end supported by the first slide member and another end supported by the second slide member such that the spring accumulates an elastic energy while the first slide member slides to a dead point, to thereby move the first slide member by the accumulated elastic energy after the dead point.

As one example related to the present invention, the slide-slip module may include first link members each having one end connected to the upper body to slide the upper body up and down, a second link member connected to another end of each first link member for rotating each first link member to slide the upper body up and down, and a third link member having one end rotatably connected to the lower body and another end connected to the second link member to rotate the second link member in cooperation with the sliding movement of the extension member.

As one example related to the present invention, the slide-slip module may further include a contact protrusion disposed at the extension member and configured to operate the third link member.

As one example related to the present invention, the slide-slip module may further include a frame member disposed at the lower body and configured to support the first to third link members.

As one example related to the present invention, the slide-slip module may further include a restoring spring having one end supported by the second link member and another end supported by the frame member and disposed to apply an elastic force in a direction to slide the upper body up.

As one example related to the present invention, the slide-slip module may further include guide slots disposed at the frame member and configured to respectively guide the first link members such that connection points between the first link members and the upper body slide in a longitudinal direction.

As one example related to the present invention, a display may be disposed at the upper surface of the upper body, and a keypad may be disposed at a region of the lower body exposed in the open state.

As one example related to the present invention, a first display may be disposed at the upper surface of the upper body and a second display may be disposed at a region of the lower body exposed in the open state.

As one example related to the present invention, at least one of the first or second display may further be provided with a touch sensing unit configured to allow touch input.

As one example related to the present invention, the upper body is configured to be slid widthwise with respect to the lower body.

The foregoing and other objects, features, aspects and advantages of a portable terminal according to the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE INVENTION

Description will now be given in detail of a portable terminal in accordance with the present invention, with reference to the accompanying drawings.

Figure 1:
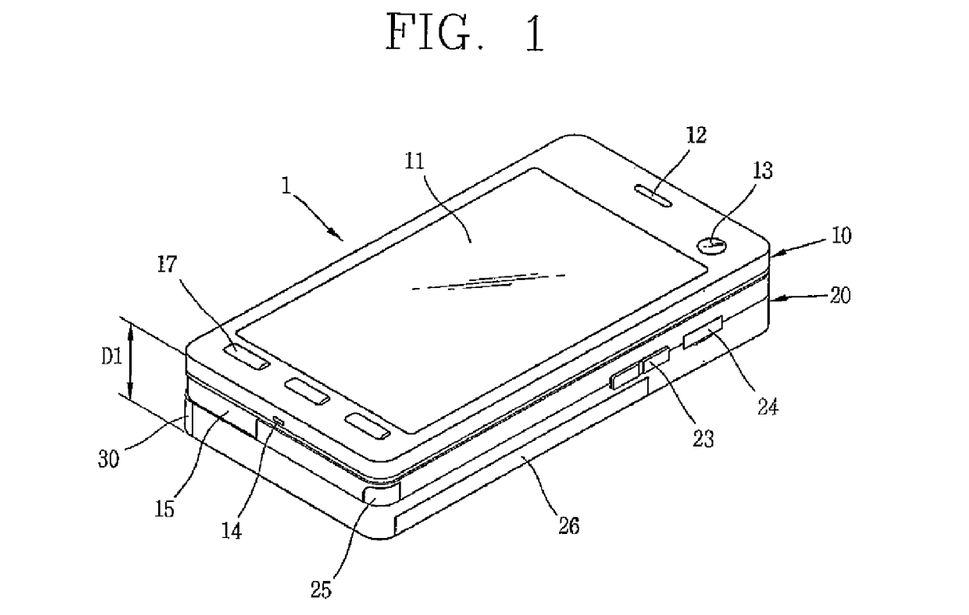
FIG. 1 is a perspective view of an upper surface of a portable terminal in accordance with one embodiment of the present invention.
Figure 2:
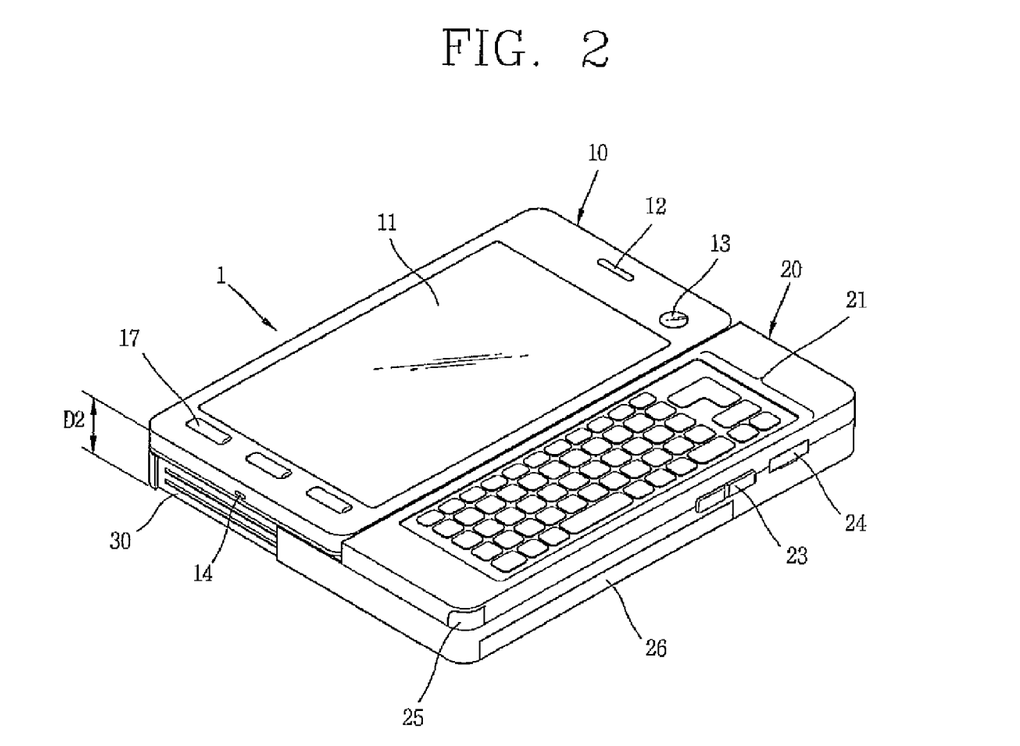
FIG. 2 is a perspective view showing the upper surface of the portable terminal of FIG. 1 in a state where an upper body is open with respect to a lower body.

As shown in FIGS. 1 and 2, a portable terminal 1 may include an upper body 10 and a lower body 20 movably coupled to each other. Various functions or components may be disposed at each upper surface of the upper body 10 and the lower body 20 according to which function or user interface the portable terminal 1 prefers.

As one example, as shown in FIG. 2, a display 11 for outputting visual information may be disposed at an upper surface of the upper body 10, and a keypad 21 for inputting a control command or the like may be installed at an upper surface of the lower body 20. In addition, in case a visual output function is mainly emphasized in the portable terminal 1, displays may be installed at both the upper and lower bodies 10 and 20. In this case, each display may be allowed to output two or more operations that are in progress so as to perform a multitasking function. Also, a display may be provided with a touch sensing unit for sensing a touch input.

The display 11 may visually display information related to various modes of the portable terminal 1. Examples of the display 11 may include a Liquid Crystal Display (LCD) module, an Organic Light Emitting Diode (OLED) module, a Transparent OLED (TOLED) module, e-paper and the like.

The portable terminal 1 may have a device for wireless mobile communication. To this end, the portable terminal 1 may include a device for processing a radio wave signal into a communicatible voice, or inversely processing a user's voice into a radio wave signal for transmission. For a call communication, a first audio output unit 12 for outputting a call communication sound with another party may be disposed at one side of an upper surface of the portable terminal 1. An audio input unit 14 for amplifying a call communication sound may be disposed at an opposite end portion to the first audio output unit 12. The first audio output unit 12 may be implemented as a loud speaker for outputting an indication sound, a multimedia playback sound, or the like.

The keypad 21 may include keys having numbers, characters or various symbols in order for a user to input text in an input or edit mode. Whether or not the keypad 21 is operating may visually be recognized from the exterior through the display 11. The keypad 21 may be implemented as a dome switch or touch screen to be pushed or touched by a user to input commands or information. Alternatively, the keypad 21 may be implemented as a wheel, a joy or a joystick to rotate keys.

A window may completely cover the upper surface of the upper body 10 such that a physical boundary cannot be formed by the display 11. However, the arrangement of several keys 17 at one side of the upper body 10 can facilitate a user to select or convert the mode of the portable terminal 1 even in the closed state as shown in FIG. 1.

FIG. 1 shows a closed state of the portable terminal and FIG. 2 shows an open state thereof. That is, the closed state denotes a state in which the lower body 20 is completely overlapped by the upper body 10, while the open state denotes a state in which the lower body 20 is partially overlapped with the upper body 10 by a sliding movement of the upper body 10, and the upper body 10 is located lower than in the closed state by its slip motion. Here, the state in which the lower body 20 is completely overlapped with the upper body 10 may denote a configuration where only a certain portion of the lower body 20 is completely overlapped with the upper body 10. It can be understood that the completely overlapped state of the certain portion of the lower body 20 is the closed state and a partially overlapped state of the certain portion is the open state.

The thickness of the portable terminal 1 may be different in the closed state and in the open state. The thickness of the portable terminal 1 may be D1 in the closed state as shown in FIG. 1, while the thickness of the portable terminal 1 may be D2, which is thinner than D1, in the open state as shown in FIG. 2. That is, in the open state, the upper body 10 is slipped in a thickness direction (or a longitudinal direction) with respect to the lower body 20, so as to implement a 'bar type' portable terminal which is thinner than in the closed state of FIG. 1. In this case, the open state facilitates operations of the portable terminal 1 with ensuring a wider surface in terms of the implementation of use and function of the portable terminal 1.

The lower body 20 may include an extension member 30 slidably installed in the lower body 20. The extension member 30 moves in cooperation with the movement of the upper body 10 to the open state or the closed state. That is, the extension member 30 may accommodate the upper body 10 in a longitudinal direction in the open state.

Referring to FIG. 1, the upper body 10 of the portable terminal 1 is first slid widthwise and then slipped in the thickness direction so as to implement the open state. In the state shown in FIG. 1, contents outputted through the display 11 may be aligned appropriate for the length direction of the portable terminal 1. Contrast to this, as shown in FIG. 2, in the open state of the portable terminal 1, the portable terminal 1 may be set for visual information to be outputted to the display 11 by being rotated up to approximately 90°. In this case, the portable terminal 1 may be used in various modes such as editing, web browsing, computing or playing games. In case of using the portable terminal 1 in the edit mode, the keypad 21 may have a qwerty configuration.

Referring to FIG. 2, in the open state, the upper surface of the upper body 10 is flush with the upper surface of the lower body 20. That is, as the upper body 10 is slid in the width direction and slipped in the thickness direction with respect to the lower body 20, a step, which is formed due to the upper surface of the upper body 10 being higher than the upper surface of the lower body 20, can be prevented, resulting in improved structural stability and an improved outer appearance.

Figure 3:
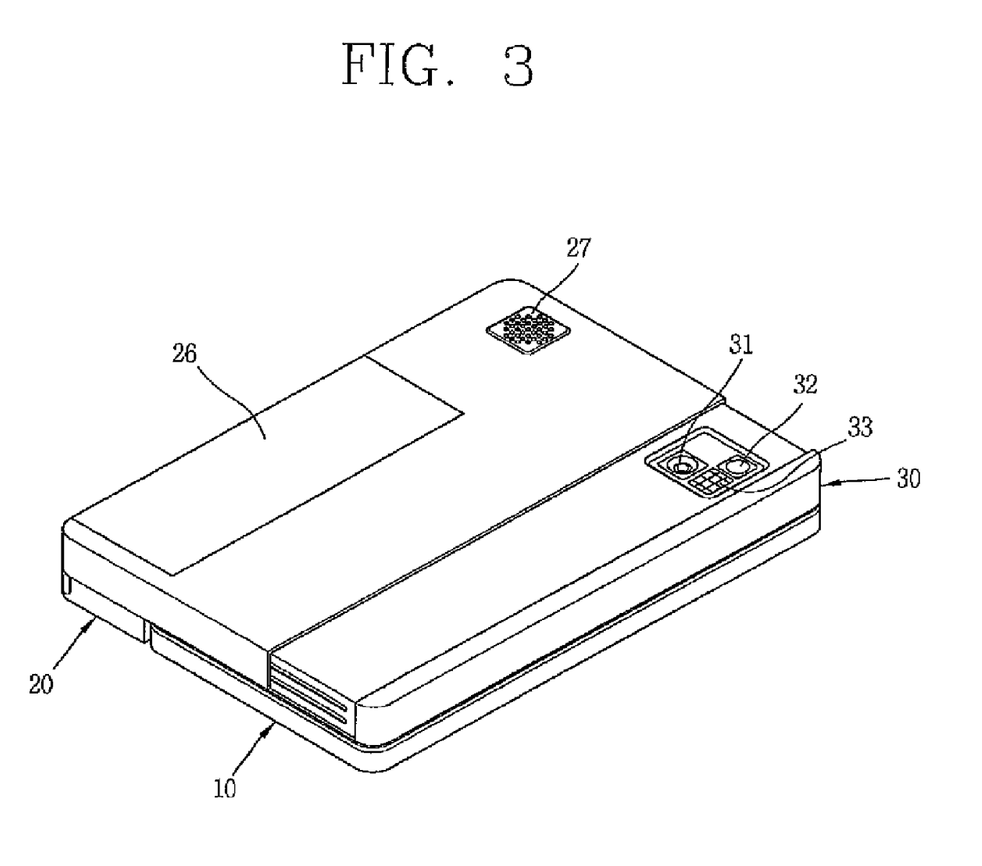
FIG. 3 is a perspective view showing a lower surface of the portable terminal of FIG. 2.

Referring to FIG. 3, a second audio output unit 27 may further be mounted at a lower surface of the lower body 20. The second audio output unit 27 can cooperate with the first audio output unit 12 to provide stereo output. Also, the second audio output unit 27 can be configured to operate as a speakerphone.

A second image input unit 31 may further be mounted at a rear surface of the extension member 30 The second image input unit 31 moves in cooperation with the movement of the extension member 30. Accordingly, in the state where the extension member 30 is retracted in the lower body 20, the second image input unit 31 is accommodated inside the lower body 20, so as to protect a lens or the like from the exterior.

The second image input unit 31 faces a direction which is substantially opposite to a direction faced by a first image input unit 13. The second image input unit 31 may be implemented as a camera having a different number of pixels from those of the first image input unit 13. For example, the first image input unit 13 may operate with relatively fewer pixels (lower resolution). Thus, the first image input unit 13 may be useful when a user can capture his face and send it to another party during a video call or the like. On the other hand, the second image input unit 31 may operate with relatively more pixels (higher resolution) such that it can be useful for a user to obtain higher quality pictures for later use.

A flash 33 and a mirror 32 may be disposed adjacent to the second image input unit 31. The flash 33 operates in conjunction with the second image input unit 31 when taking a picture using the second image input unit 31. The mirror 32 can cooperate with the second image input unit 31 to allow a user to photograph himself in a self-portrait mode.

In the foregoing description, the second image input unit 31 or the like has been described to be disposed at the extension member 30; however, the present invention may not be limited to such a configuration. For example, at least one or more of the components, such as the second image input unit 31, the mirror 32 and the flash 33, which have been described to be disposed at the extension member 30, can be mounted at the lower body 20. In addition, without the second image input unit 31, the first image input unit 13 can be implemented to be rotatable so as to rotate to a direction in which the second image input unit 31 faces.

Figure 4:
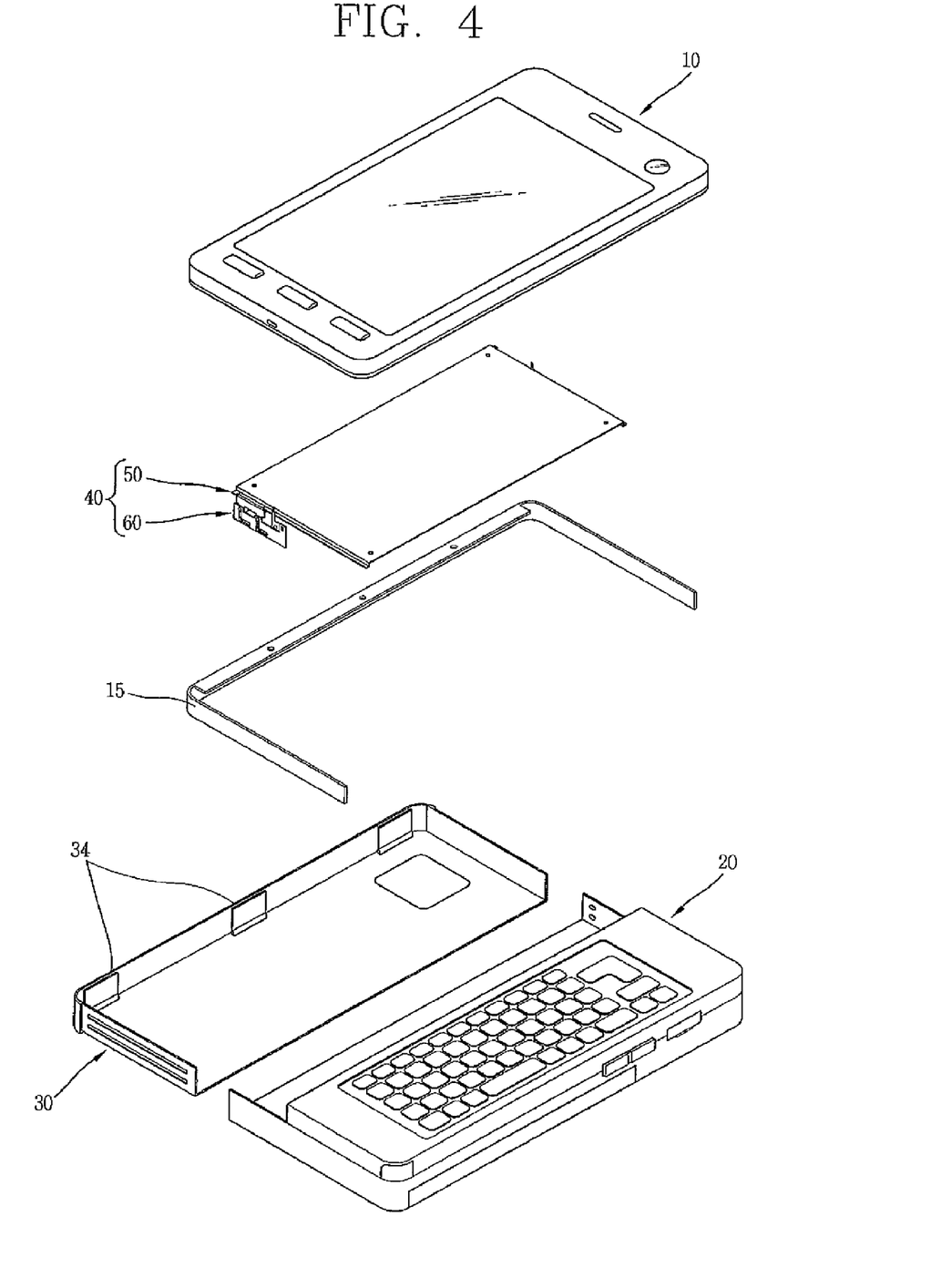
FIG. 4 is a disassembled view of the portable terminal of FIG. 1.
Figure 5:
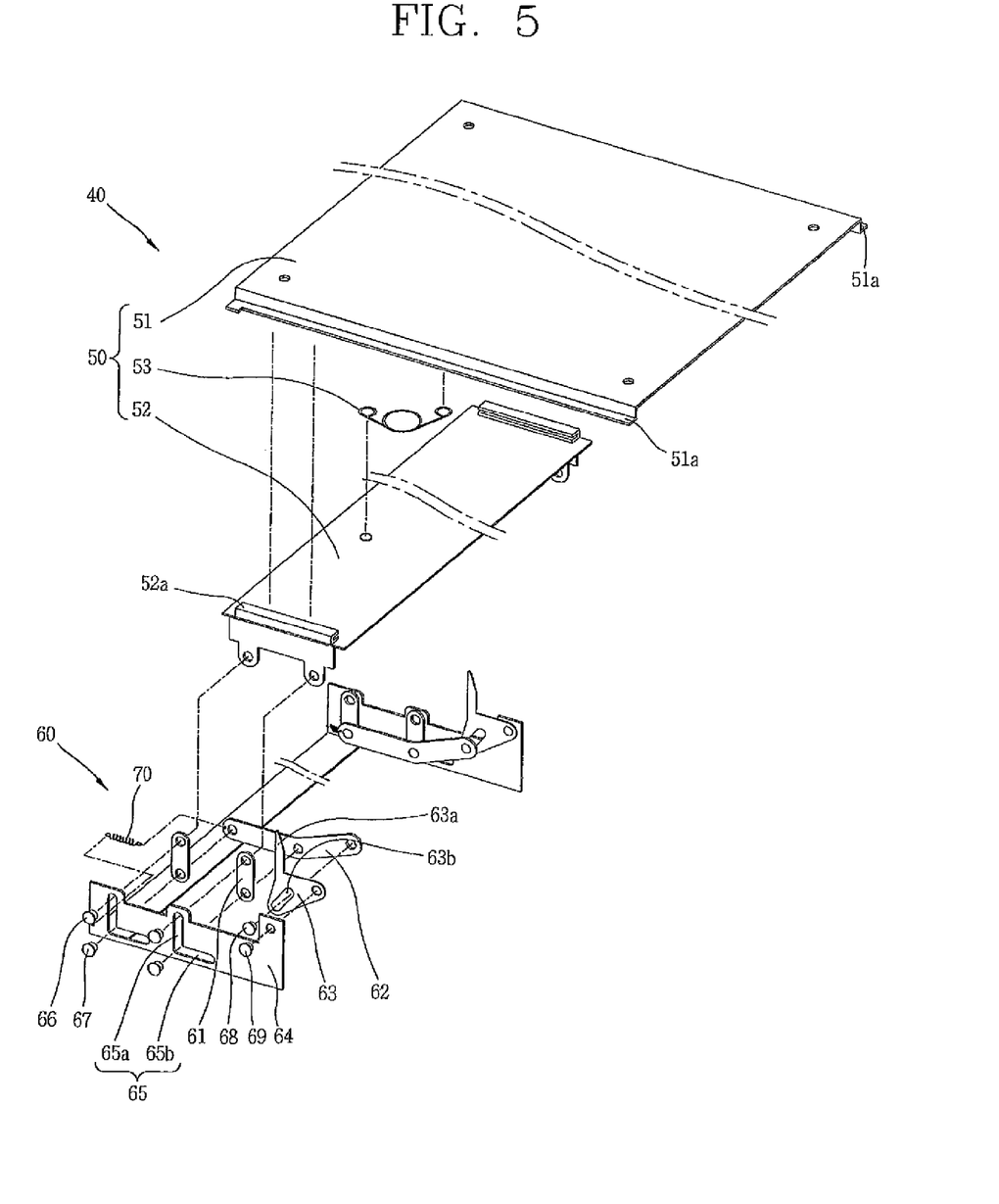
FIG. 5 is a disassembled view of a slide-slip module of FIG. 4.

Referring to FIGS. 4 and 5, the slide-slip module 40 may be disposed between the upper body 10 and the lower body 20 to couple the upper body 10 to the lower body 20, thereby implementing the movement between the closed state of FIG. 1 and the open state of FIG. 2.

The slide-slip module 40 may include an elastic unit 50 configured to apply an elastic force to the upper body 10 upon the sliding movement of the upper body 10, and a slip unit 60 configured to slip the upper body 10 in a thickness direction. The elastic unit 50 may serve to guide the sliding movement of the upper body 10.

The elastic unit 50 shown in FIG. 5 may include a first slide member 51 fixed to the upper body 10, a second slide member 52 fixed to the slip unit 60 and slidably coupled to the first slide member 51, and a spring 53.

For ensuring a thin thickness and rigidity, the first and second slide members 51 and 52 may be formed in the form of a plate. Both end portions 51a of the first slide member 51 may move while being restricted in guide rails 52a formed at both ends of the second slide member 52. Here, the first and second slide members 51 and 52 may not be limited to such forms, but many variations can be made.

One end of the spring 53 is supported by the first slide member 51 and another end thereof is supported by the second slide member 52. The spring 53 may accumulate an elastic energy while the first slide member 51 moves up to a dead point. After the first slide member 51 moves over the dead point, the spring 53 applies the accumulated elastic energy to the first slide member 51 to continuously move to its ongoing direction. The number and location of springs 53 may depend on a stroke from the closed state to the open state. Besides, a stop position of the first slide module 51 may additionally be set between the closed state and the open state so as to achieve an intermediately open state. In this case, the portable terminal 1 can be configured to be converted into a mode appropriate for the intermediately open state.

The slide-slip module 40 may guide the upper body 10 in a non-planar direction (may be referred to as a longitudinal direction or a thickness direction). To this end, referring to FIG. 5, the slip unit 60 may include, for example, first to third link members 61, 62 and 63.

In more detail, each first link member 61 has one end connected to the second slide member 52 to slide the upper body 10 upwardly. Another end of the first link member 61 is connected to the second link member 62. The second link member 62 rotates the first link members 61 to slide the upper body 10 upwardly.

One end of the third link member 63 is rotatably connected to the lower body 10. Another end thereof is connected to the second link member 62 so as to operate the second link member 62 by the sliding movement of the upper body 10.

Accordingly, when the upper body 10 moves to rotate the third link member 63, the third link member 63 operates the second link member 62. The second link member 62 then moves the first link members 61 in a longitudinal direction, to move the upper body 10 up and down.

A frame member 64 may support the first to third link members 61, 62 and 63 so as to guide an accurate movement of the first to third link members 61, 62 and 63. The frame member 64 may be formed in a form of a metallic plate, to ensure a thin thickness and an appropriate rigidity.

The frame member 64 may be provided with guide slots 65. As shown in FIG. 5, each of the guide slots 65 may include a longitudinal section 65a for guiding the connection point between the first link member 61 and the second slide member 52, and a horizontal or tilt section 65b for guiding the connection point between the first link member 61 and the second link member 62.

As shown in FIG. 4, a shielding member 15 for shielding the slide-slip module 40 may be disposed at a side surface of the upper body 10. The shielding member 15 may move downwardly in cooperation with a downward movement of the upper body 10. To this end, the extension member 30 may further be provided with an accommodating groove 34 for receiving the shielding member 15.

The upper body 10 and the lower body 20 are connected to each other by an electrical connecting unit (not shown) which is moved or transformed in a direction in which the upper body 10 moves. Such connecting unit may be configured as a cable or a flexible Printed Circuit Board (PCB).

Figure 6A:
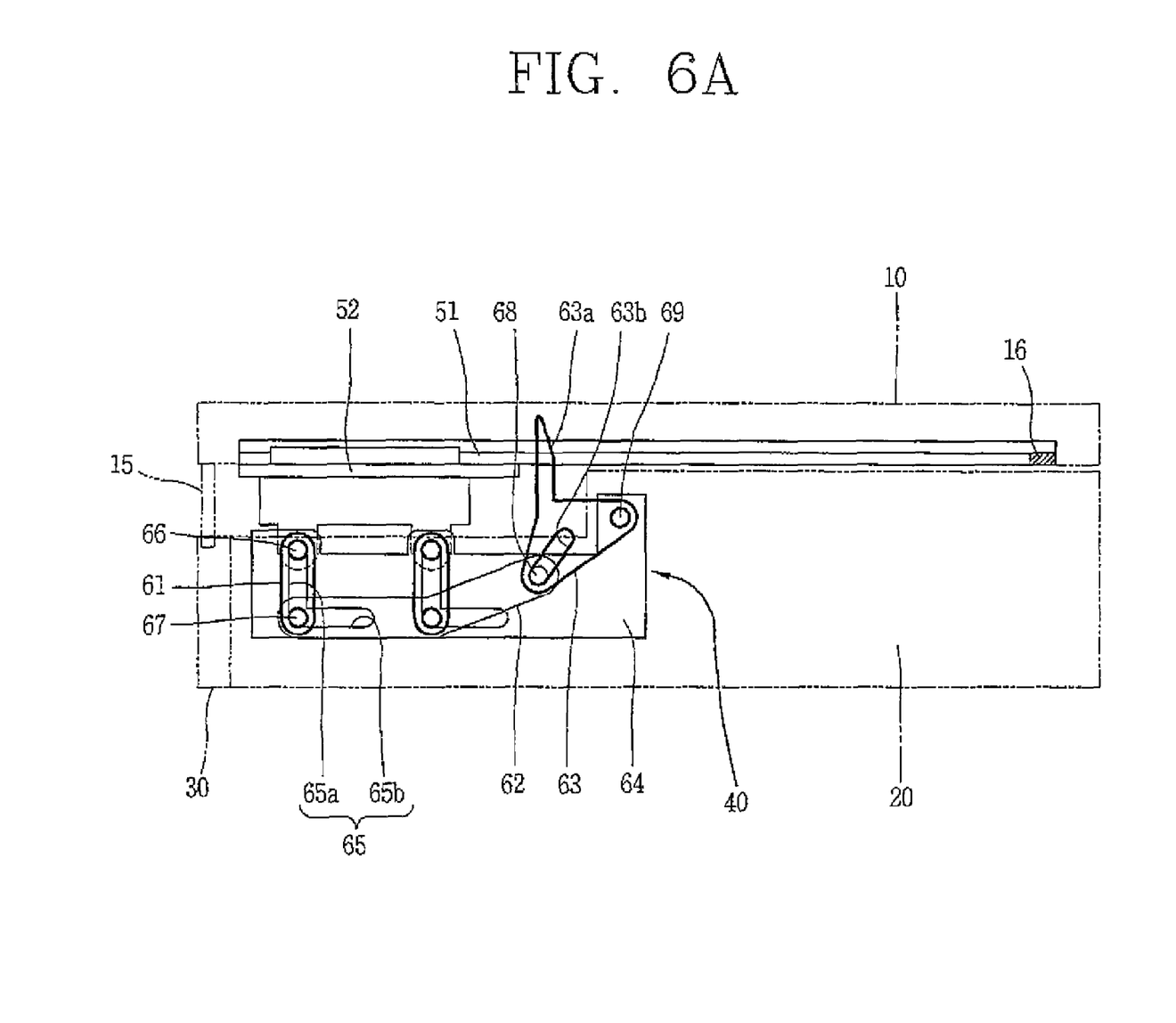
FIGS. 6A to 6C are cross-sectional views showing the configuration and operation of the slide-slip module of FIG. 5.
Figure 6B:
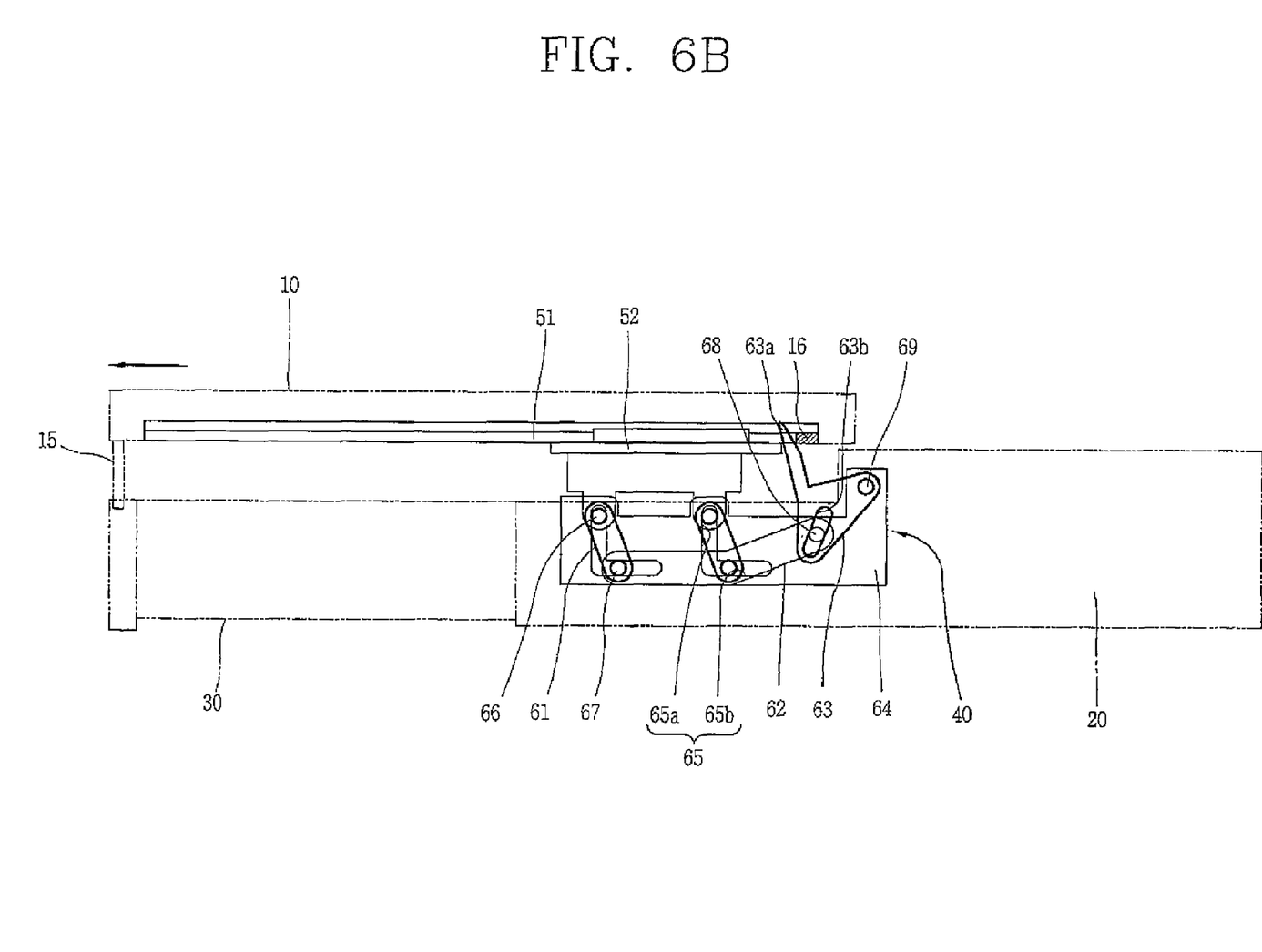
Figure 6C:
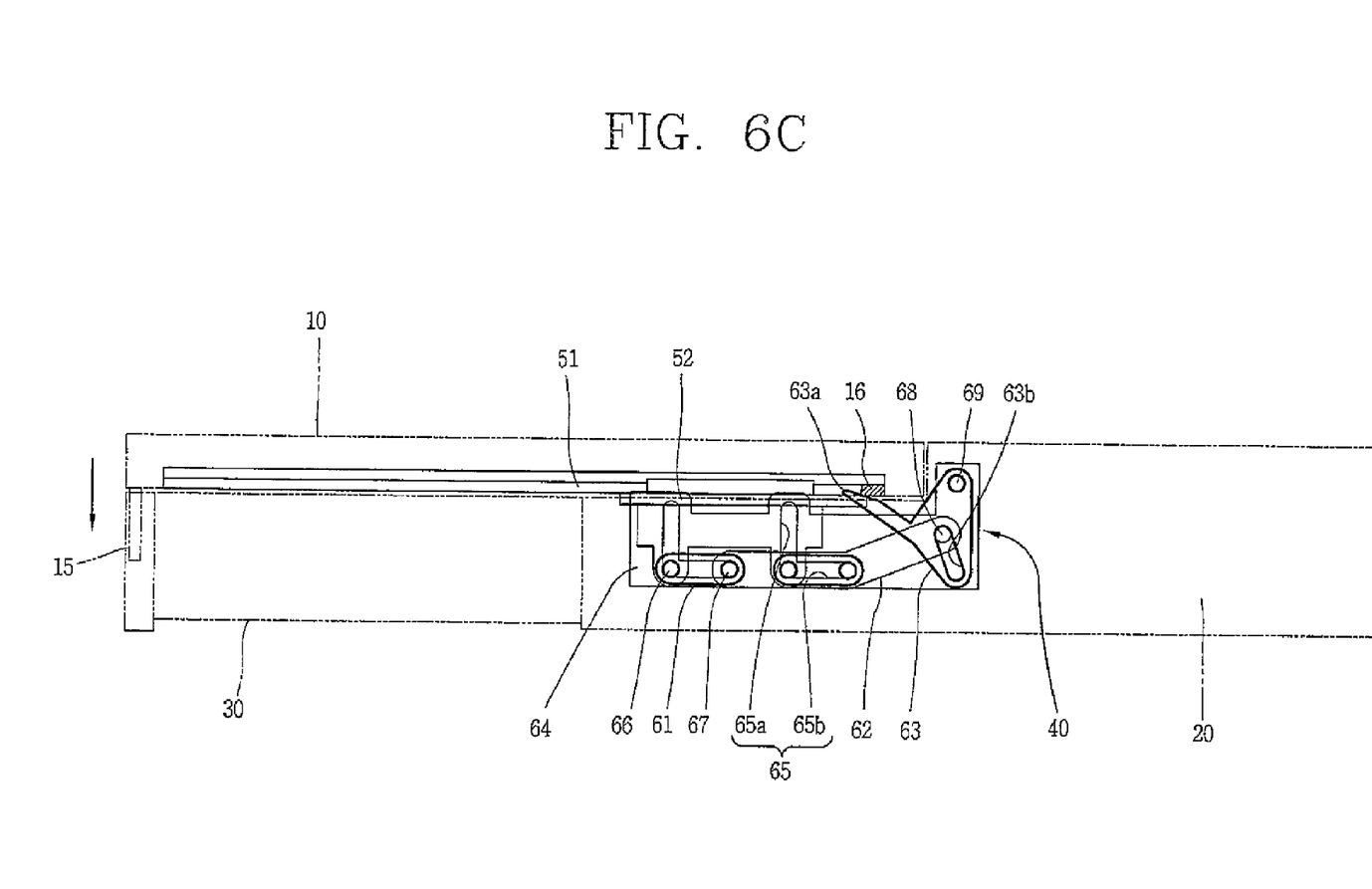

Referring now to FIGS. 6A to 6C, the first link members 61 are coupled to the second slide member 52 by first moving pins 66, and the first link members 61 are coupled to the second link member 62 by second moving pins 67. Also, the second link member 62 is coupled to the third link member 63 by a third moving pin 68, and the third link member 63 is coupled to the lower body 20 by a fixing pin 69.

The first and second moving pins 66 and 67 move respectively along the longitudinal section 65a and the horizontal section 65b of each guide slot 65 which are formed at the frame member 64, thus to transfer a force.

A slot 63b may further be formed to guide the movement of the third moving pin 68 upon the rotation of the third link member 63.

The third link member 63 may be provided with a contact protrusion 63a rotated by being pushed by a stopping protrusion 16 of the upper body 10 at the step of completing the sliding movement of the upper body 10.

As shown in FIG. 6A, in the closed state, the first moving pins 66 are located at an upper end of the longitudinal section 65a of the guide slot 65, and each of the second moving pins 67 are located at a left end of the corresponding horizontal sections 65b.

As shown in FIG. 6B, upon sliding the upper body 10 from the state of FIG. 6A, the stopping protrusion 16 located at the end of the upper body 10 comes in contact with the contact protrusion 63a of the third link member 63 to thereby push the third link member 63. Accordingly, the third link member 63 rotates counterclockwise, thereby pulling up the second link member 62 coupled thereto by the third moving pin 68. The second moving pins 67 accordingly move to a right side along the horizontal section 65b of each guide slot 65.

Accordingly, the first link members 61 are inclined in the direction in which the fixing pin 69 moves. Here, since the first moving pins 66 are restricted in the longitudinal sections 65a of each guide slot 65, the second slide member 52 and the upper body 10 move only in the longitudinal (thickness) direction. If the longitudinal section 65a of the guide slot 65 is replaced with a curved or inclined slot, the second slide member 52 and the upper body 10 may move appropriate for the curved or inclined shape. In this case, in order to prevent the lower body 20 from interfering with the lower end of the upper body 10, a chamfer may be formed at the lower end of the upper body 10.

When the second link member 62 is moved by the third link member 63, in order to return the second link member 62 to its original state, the second link member 62 may be coupled to a restoring spring 70. Here, the restoring spring 70 may have a resistance smaller than that of the elastic unit 53 such that the closed state can be maintained by the spring 53 of the elastic unit 50.

Each of the first to third link members 61, 62 and 63 may be disposed at both ends of the portable terminal 1 in one pair. In order for the upper body 10 to slide only in a longitudinal direction, one pair of the first link member 61 may be further installed at the portable terminal 1 in the width direction.

As such, when the upper body 10 is slipped down by the first to third link members 61, 62 and 63, the shielding member 15 fixed to the upper body 10 is accommodated in the extension member 30.

Accordingly, as shown in FIG. 6C, when the upper body 10 is in the open state with respect to the lower body 20, the upper surface of the upper body 10 is flush with the upper surface of the lower body 20 exposed by the movement of the upper body 10. That is, in the open state, the portable terminal 1 may implement a bar type portable terminal by the slide-slip module 40 and the extension member 30. Hence, even if the upper body 10 moves with respect to the lower body 20, a step is not formed.

Figure 7A:
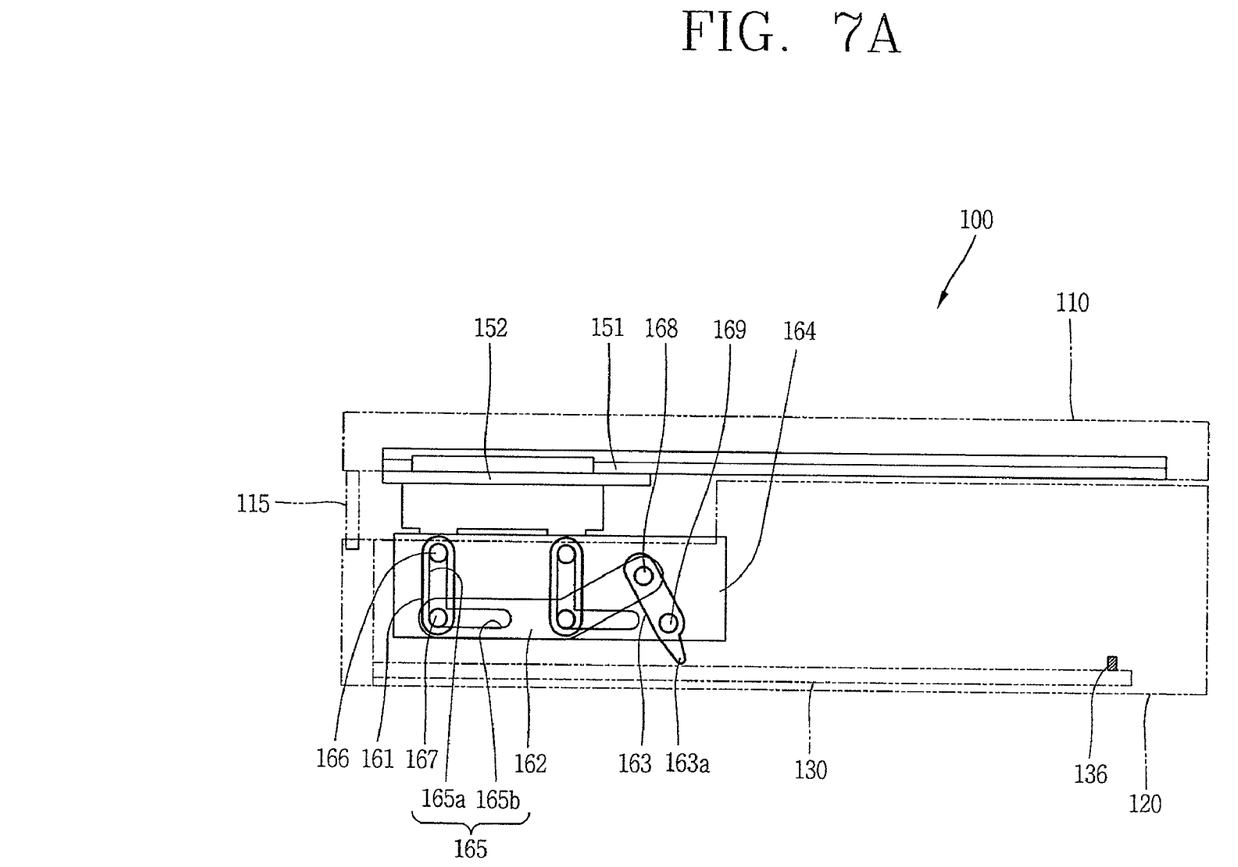
FIGS. 7A to 7C are cross-sectional views showing another embodiment of a slide-slip module of a portable terminal according to the present invention.
Figure 7B:
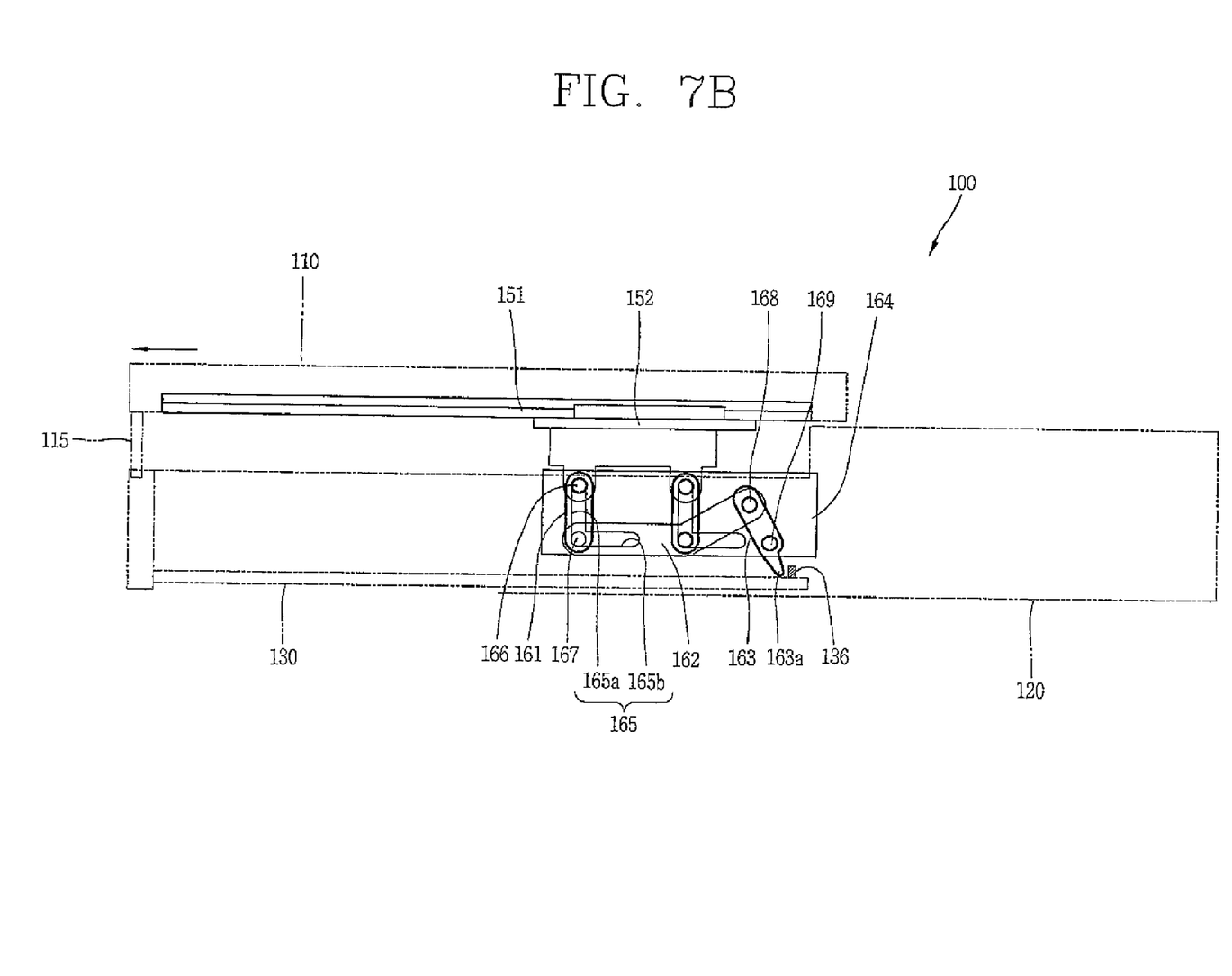
Figure 7C:
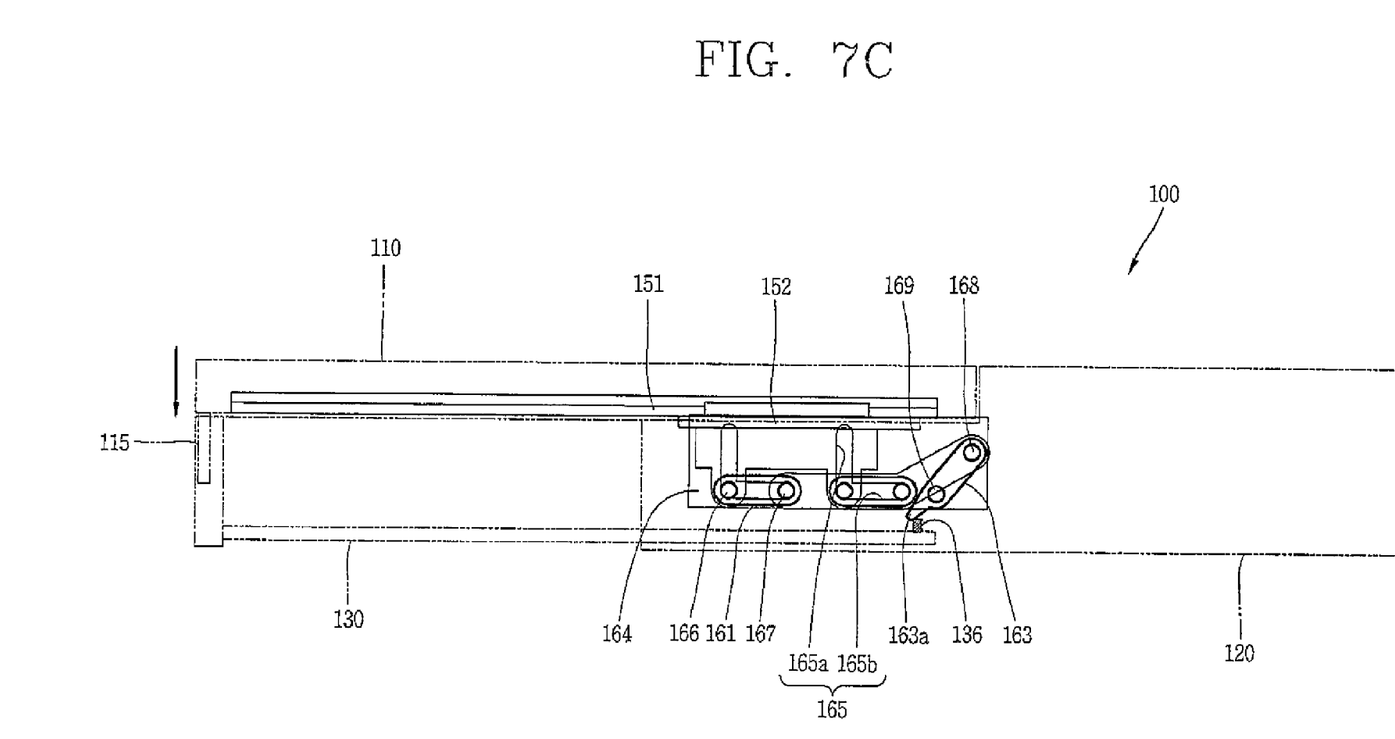

FIGS. 7A to 7C are cross-sectional views showing another embodiment of a slide-slip module of a portable terminal according to the present invention.

A slide-slip module 160 may include an elastic unit having a first slide member 151 and a second slide member 152, and a slip unit having first to third link members 161, 162 and 163. However, in this embodiment, the third link member 163 is connected to a lower portion of a lower body 120 by a fixing pin 169. An extension member 130 may be provided with an operating protrusion 136 for operating the third link member 163.

Thus, when the extension member 130 moves up to an end of a slide stroke, the operating protrusion 136 of the extension member 130 pushes the third link member 163 to rotate the slip unit.

The configuration and operation of the elastic unit, the first link member 161 and the second link member 162 are the same as those in the previous embodiment, and thus detailed description thereof will not be repeated.

As shown in FIG. 7A, an upper body 110 is maintained in a completely overlapped state with respect to the lower body 120.

As shown in FIG. 7B, upon sliding the upper body 110 from the state of FIG. 7A, the operating protrusion 136 formed at the end of the extension member 130 comes in contact with a contact protrusion 163a of the third link member 163 to thereby push it. The third link member 163 then rotates in a clockwise direction, and pulls the second link member 162 coupled thereto by a third moving pin 168. The second moving pins 167 thusly move to a right side along horizontal sections 165b of guide slots 165.

Accordingly, the first link members 161 are inclined in a direction in which the second moving pins 167 move. Here, since first moving pins 166 are restricted in longitudinal sections 165a of the guide slots 165, the second slide member 152 and the upper body 110 move only in the longitudinal direction.

As such, when the upper body 110 is slipped down by the first to third link members 161, 162 and 163, the shielding member 115 fixed to the upper body 110 is accommodated in the extension member 130. Accordingly, the upper surface of the upper body 110 is configured to be flush with the upper surface of the lower body 120 exposed by the movement of the upper body 110.

Figure 8:
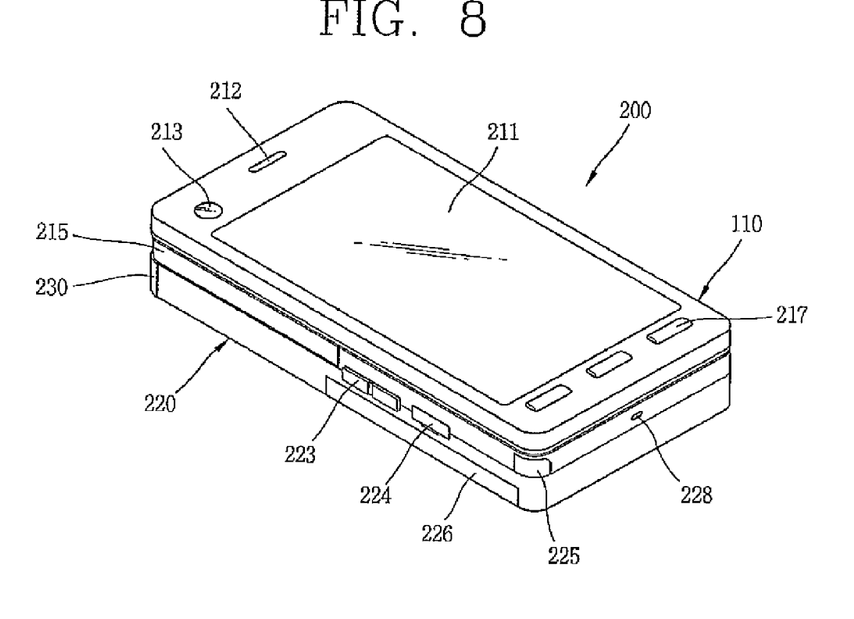
FIG. 8 is a perspective view of an upper surface of a portable terminal according to the present invention.
Figure 9:
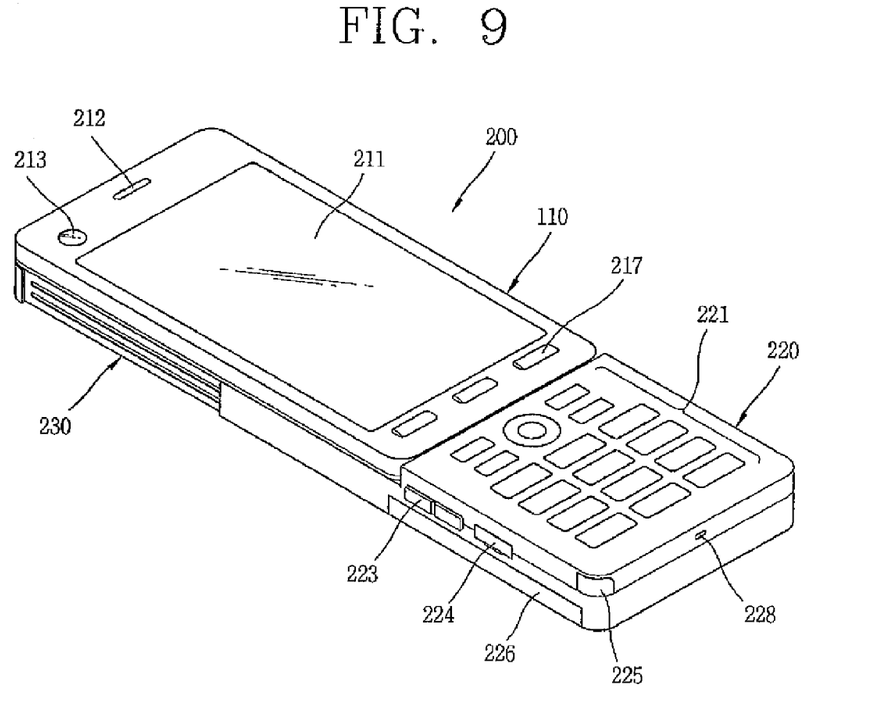
FIG. 9 is a perspective view showing the upper surface of the portable terminal of FIG. 8 in an open state.

Referring now to FIGS. 8 and 9, an upper body 210 moves in a length direction with respect to a lower body 220 so as to implement an open state, or move in an opposite direction to implement a closed state. In the open state, the upper body 210 can be located lower than in the closed state as well as exposing a certain portion of the lower body 220. An inner slide-slip module is shielded by a shielding member 215 in the open state, and the shielding member 215 is accommodated in an extension member 230 in the closed state. Therefore, the portable terminal can be configured like a thin bar type portable terminal on the whole.

The inventive concepts described herein may also be summarized as being related to a portable terminal comprising: a main body; a slidable body operatively connected with the main body to allow relative sliding movement thereof to achieve at least a closed configuration and an opened configuration; and an extension member accommodated by the main body and allowed to move together with the slidable body such that the extension member is extended from the main body at the opened configuration and retracted into the main body at the closed configuration.

The closed configuration may be achieved when the main body and the slidable body are stacked together, while the opened configuration is achieved when the main body and the slidable body are in a flat orientation.

The portable terminal may comprise a slide-drop (slide-slip) mechanism that allows the slidable body and the main body to slide in a planar direction and move in a non-planar direction, such that the slidable body and the main body become relatively planar with each other at the opened configuration.

The opened configuration may result in the upper surfaces of the main body and of the slidable body being flush with each other.

The slide-drop mechanism may allow the slidable body to pop up from the opened configuration and retract back onto the main body to achieve the closed configuration.

The slidable body and the extension member may have distal ends that are operatively connected together such that the slidable body and the extension member slide together, being locked together at the opened configuration, and being unlocked from each other at the closed configuration.

At least one of the distal ends may accommodate at least one periphery component comprising at least one of an image capture device allowing unidirectional, bidirectional, or multi-directional image capturing, a memory device, a storage device, a user input device, a user output device, a headset jack, a connection port, a wired communication port, and a wireless communication port.

The main body, the slidable body, and the extension member further cooperate together such that at least one intermediate configuration between the closed and opened configurations is achieved.

The closed configuration, the opened configuration, and the intermediate configuration respectively allow different user interface possibilities, activation of various functions, or operation modes.

Figure 10:
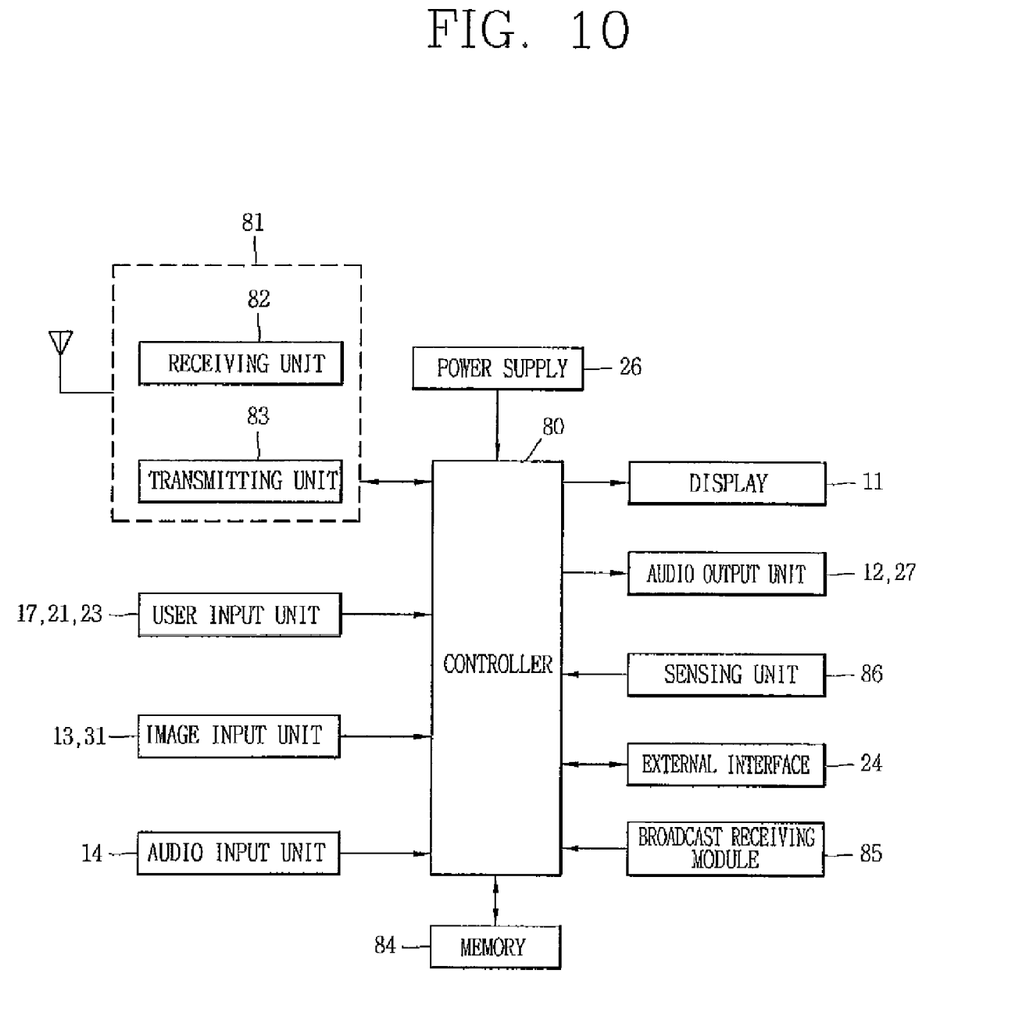
FIG. 10 is a block diagram of a portable terminal according to the present invention.

FIG. 10 is a block diagram of a portable terminal according to the present invention.

As shown in FIG. 10, a portable terminal may exemplarily include a wireless communication module 81, user input units 17, 21 and 23, image input units 13 and 31, an audio input unit 14, a display 11, audio output units 12 and 27, an external interface 24, a broadcast receiving module 85, a memory 84, a sensing unit 86, a power supply 26, a controller 80 and the like.

The user input units 17, 21 and 23 may be configured as shown in FIG. 1 or 2, thus to provide the controller 80 with input data inputted by a user to control the operation of the portable terminal.

The controller 80 controls an overall operation of the portable terminal. For example, the controller 80 may perform related control and processing for a voice call communication, data communication, video call communication and the like.

The wireless communication module 81 may transmit/receive a radio signal with a mobile communication base station via an antenna. For example, the wireless communication module 81 manages transmission/reception of audio data, text data, video data and control data under the control of the controller 80. To this end, the wireless communication module 81 may include a transmitting unit 83 for modulating and transmitting a signal to be sent, and a receiving unit 82 for demodulating a signal received.

The image input units 13 and 31 may be implemented as cameras for capturing images or video for a user or the like. In a mode in which the image input units 13 and 31 are used, namely, in a capturing mode or a video call mode, the display 11 displays characters, symbols or icons for controlling various functions related to the image input units 13 and 31 by the control of the controller 80.

The image input units 13 and 31 process image frames of still images or video obtained by an image sensor. Such processed image frames are converted into image data displayable on the display 11 to be then outputted through the display 11. The image frames processed by the image input units 13 and 31 may be stored in the memory 84 under the control of the controller 80 or be sent to the exterior via the wireless communication module 81.

The audio input unit 14 receives an external audio signal via a microphone while the portable terminal is in a particular mode, such as phone call mode, recording mode and voice recognition mode. This audio signal is processed and converted into digital data. Such processed digital data is converted into a data format transmittable to a mobile communication base station via the wireless communication module 81 when the portable terminal is in the phone call mode, and then outputted to the wireless communication module 81. The processed digital data may be stored in the memory 84 in a recording mode.

The audio input unit 14 may include assorted noise removing algorithms to remove noise generated in the course of receiving the external audio signal.

The display 11 may display information processed in the portable terminal. For example, when the portable terminal is in a phone call mode, the display 11 displays a User Interface (UI) or a Graphic User Interface (GUI) related to the call under the control of the controller 80. When the portable terminal is in the video call mode or a capturing mode, the display 11 displays images captured or UI or GUI under the control of the controller 80.

Contents outputted through the display 11 may be items or list to be inputted, which are sensed by a touch sensing unit further installed in the display 11.

The audio output units 12 and 27 may receive audio data which is received from the wireless communication unit 81 in various modes including call-receiving mode, call-placing mode, recording mode, voice recognition mode, broadcast reception mode, and the like, or audio data stored in the memory 84, so as to output such audio data to the exterior. The audio output units 12 and 27 may also output an audio signal relating to a particular function (e.g., call received, message received, etc.) performed in the portable terminal. The audio output units 12 and 27 may be implemented using a speaker, a buzzer, or the like.

The external interface 24 is generally implemented to couple the portable terminal to external devices. The external interface 24 may include, for example, wired/wireless headset ports (e.g., memory card, SIM/UIM card, etc.), external charger ports, wired/wireless data ports, memory card ports, and the like. As such, the external interface 24 may receive data from an external device, or provided with power and accordingly transfer the received data or power to each component within the portable terminal or transfer data of the portable terminal to an external device.

The memory 84 may store a program for the processing and control of the controller 80. Alternatively, the memory 84 may temporarily store input/output data (e.g., phonebook data, messages, still images, video and the like). The memory 84 may be implemented using any type of suitable storage medium including a hard disk, a memory card type (e.g., SD or DX memory), a flash memory, Random Access Memory (RAM), Read-Only Memory (ROM), and the like.

The sensing unit 86 provides status measurements of various aspects of the portable terminal. For instance, the sensing unit 86 may detect an open/close status of the portable terminal, a change in a location of the portable terminal, a presence or absence of user contact with the portable terminal, and the like, so as to generate a sensing signal for controlling the operation of the portable terminal. Such sensing result is outputted to the controller 80 to control the operation of the portable terminal. Also, the sensing unit 86 may sense the presence or absence of power provided by the power supply 26, the presence or absence of a coupling or other connection between the external interface 24 and an external device, and the like.

The broadcast receiving module 85 may receive a broadcast signal transmitted via satellite or terrestrial wave and converts the received broadcast signal into a data format to be displayable on the display 11, thereby outputting it to the controller 80. Also, the broadcast receiving module 85 may receive broadcast associated addition data (e.g., Electric Program Guide (EPG), channel list, and the like). Broadcast data and additional data converted by the broadcast receiving module 85 may be stored in the memory 84.

The portable terminal having been described above may not limitedly employ the configuration and method shown in the foregoing embodiments. However, the embodiments may be configured by combining all of the embodiments or part of the embodiments so as to allow many variations.

The foregoing embodiments and advantages are merely exemplary and are not to be construed as limiting the present disclosure. The present teachings can be readily applied to other types of apparatuses. This description is intended to be illustrative, and not to limit the scope of the claims. Many alternatives, modifications, and variations will be apparent to those skilled in the art. The features, structures, methods, and other characteristics of the exemplary embodiments described herein may be combined in various ways to obtain additional and/or alternative exemplary embodiments.

What is claimed is:

1. A portable terminal, comprising:
   a lower body;
   an upper body slidably connected to the lower body;
   a slide-slip module configured to couple the lower body and the upper body such that the upper body is movable between a closed position and an opened position by a slip motion thereof, wherein the upper body in the open position is located lower than the upper body in the closed position;
   an extension member accommodated by the lower body and movable together with the upper body such that the extension member is extended from the lower body at the opened position and retracted into the lower body at the closed position; and
   a shielding member disposed at a side surface of the upper body and configured to shield the slide-slip module when the upper body is in the closed position and configured to be inserted when the upper body is in the open position,
   wherein the extension member is associated with the shielding member such that the extension member extends from the lower body by a same distance as the upper body slides on the lower body.

2. The portable terminal of claim 1, wherein an accommodating groove is disposed at the extension member to accommodate the shielding member therein upon the slip motion of the upper body.

3. The portable terminal of claim 1, wherein an upper surface of the upper body is flush with an upper surface of the lower body in the opened position.

4. The portable terminal of claim 1, wherein the slide-slip module includes an elastic unit configured to apply an elastic force to the upper body upon the sliding movement of the upper body.

5. The portable terminal of claim 4, the elastic unit comprises:
   a first slide member fixed to the upper body;
   a second slide member fixed to the slide-slip module and slidably coupled to the first slide member; and
   a spring having one end supported by the first slide member and another end supported by the second slide member, such that the spring accumulates an elastic energy while the first slide member moves up to a dead point and applies the accumulated elastic energy after the dead point, thus to keep the first slide member moving.

6. The portable terminal of claim 1, wherein the slide-slip module comprises:
   first link members each having one end coupled to the upper body to slide the upper body up and down;
   a second link member coupled to another end of each of the first link members and configured to rotate the first link members so as to slide the upper body up and down; and
   a third link member having one end rotatably coupled to the lower body and another end coupled to the second link member so as to rotate the second link member in cooperation with the sliding movement of the upper body.

7. The portable terminal of claim 6, wherein the slide-slip module further comprises a contact protrusion disposed at one end of the upper body and the extension member, and the contact protrusion is configured to operate the third link member.

8. The portable terminal of claim 6, wherein the slide-slip module further comprises a frame member disposed at the lower body and configured to support the first to third link members.

9. The portable terminal of claim 8, wherein the slide-slip module further comprises a restoring spring having one end supported by the second link member and another end supported by the frame member, and disposed to apply an elastic force in a direction in which the upper body is lifted.

10. The portable terminal of claim 8, wherein the slide-slip module further comprises guide slots disposed at the frame member and configured to respectively guide the first link members such that connection points between the first link members and the upper body slide in a thicknesswise direction of the portable terminal.

11. The portable terminal of claim 1, wherein a display is disposed at the upper surface of the upper body, and a keypad is disposed at a region of the lower body exposed in the opened position.

12. The portable terminal of claim 1, wherein a first display is disposed at the upper surface of the upper body, and a second display is disposed at a region of the lower body exposed in the opened position.

13. The portable terminal of claim 12, wherein at least one of the first display and the second display further includes a touch sensing unit configured to allow a touch input.

14. The portable terminal of claim 1, wherein the upper body moves into the extension member during the slip motion of the upper body.

15. The portable terminal of claim 1, wherein the lower body includes an input device and a rear cover, and a portion of the extension member is located between the input device and the rear cover when in the closed position.

16. A portable terminal comprising:
a main body;
a slidable body slidably connected with the main body for movement between a closed position and an opened position;
an extension member accommodated by the main body and movable together with the slidable body such that the extension member is extended from the main body at the opened position and retracted into the main body at the closed position; and
a shielding member disposed at a side surface of the upper body and configured to shield a space between the main body and the slidable body,
wherein the extension member is associated with the shielding member such that the extension member extends from the lower body by a same distance as the upper body slides on the lower body.

17. The portable terminal of claim 16, wherein the closed position is achieved when the main body and the slidable body are stacked together, while the opened position is achieved when the main body and the slidable body are in a flat orientation.

18. The portable terminal of claim 17, further comprising:
a slide-drop mechanism that allows the slidable body and the main body to slide in a planar direction and move in a non-planar direction, such that the slidable body and the main body become relatively planar with each other at the opened position.

19. The portable terminal of claim 18, wherein the upper surfaces of the main body and of the slidable body are flush with each other in the opened position.

20. The portable terminal of claim 18, wherein the slide-drop mechanism allows the slidable body to pop up from the opened position and retract back onto the main body to achieve the closed position.

21. The portable terminal of claim 16, wherein the slidable body has a distal end and the extension member has a distal end that are operatively connected together such that the slidable body and the extension member slide together.

22. The portable terminal of claim 21, wherein at least one of the distal ends accommodates at least one periphery component comprising at least one of an image capture device allowing uni-directional, bi-directional, or multi-directional image capturing, a memory device, a storage device, a user input device, a user output device, a headset jack, a connection port, a wired communication port, and a wireless communication port.

23. The portable terminal of claim 16, wherein the main body, the slidable body, and the extension member further cooperate together such that at least one intermediate position between the closed position and opened position is achieved.

24. The portable terminal of claim 23, wherein the closed position, the opened position, and the intermediate position respectively allow different user interface possibilities, activation of various functions, or operation modes.

25. The portable terminal of claim 16, wherein the slidable body moves into the extension member during movement to the opened position.

26. The portable terminal of claim 16, wherein the main body includes an input device and a rear cover, and a portion of the extension member is located between the input device and the rear cover when in the closed position.

27. A portable terminal, comprising:
a lower body;
an upper body slidably connected to the lower body;
a slide-slip module configured to couple the lower body and the upper body such that the upper body is movable between a closed position and an opened position by a slip motion thereof, wherein the upper body in the open position is located lower than the upper body in the closed position; and
an extension member accommodated by the lower body and movable together with the upper body such that the extension member is extended from the lower body at the opened position and retracted into the lower body at the closed position,
wherein the slide-slip module comprises:
first link members each having one end coupled to the upper body to slide the upper body up and down;
a second link member coupled to another end of each of the first link members and configured to rotate the first link members so as to slide the upper body up and down; and
a third link member having one end rotatably coupled to the lower body and another end coupled to the second link member so as to rotate the second link member in cooperation with the sliding movement of the upper body.

* * * * *